UNITED STATES PATENT OFFICE.

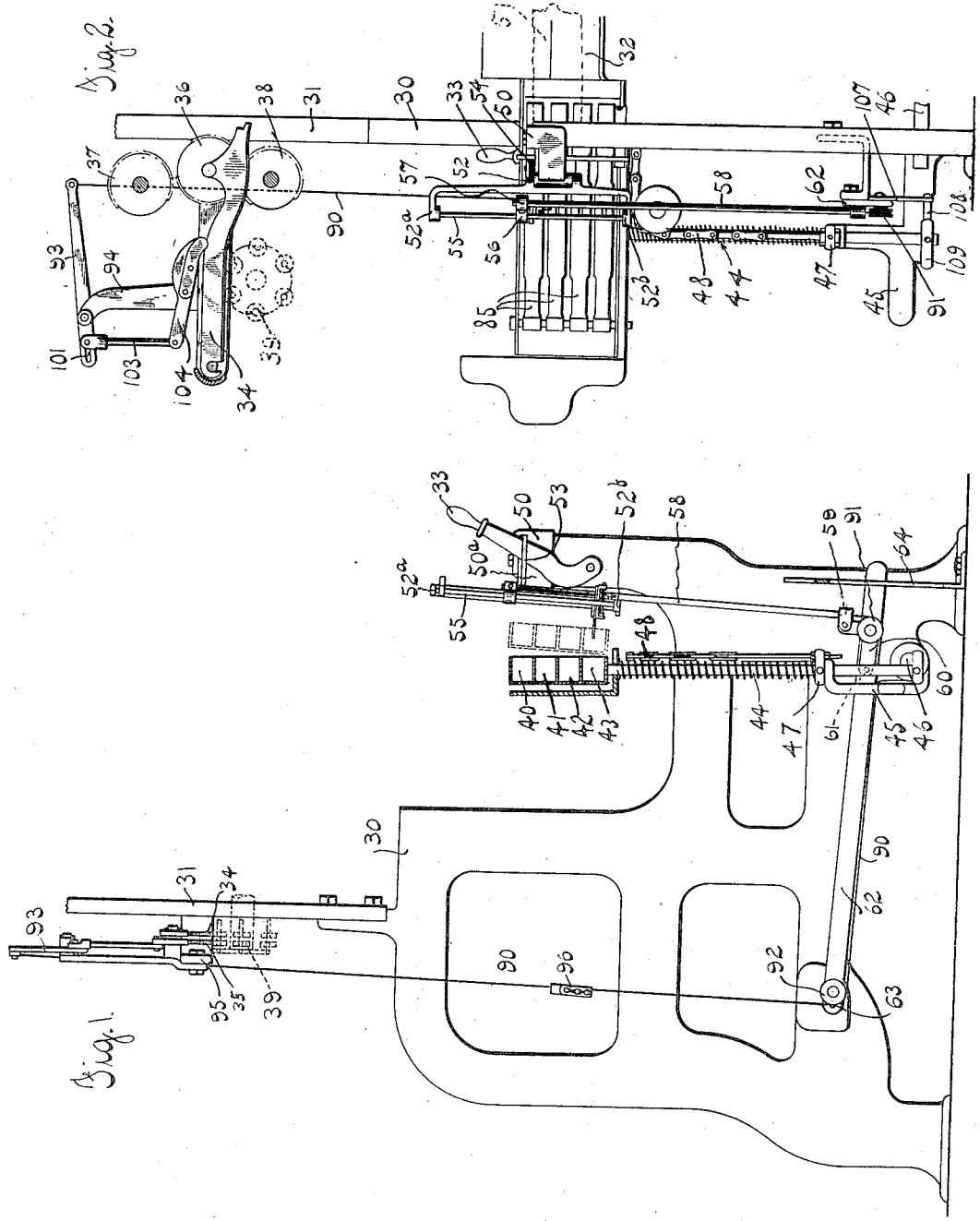

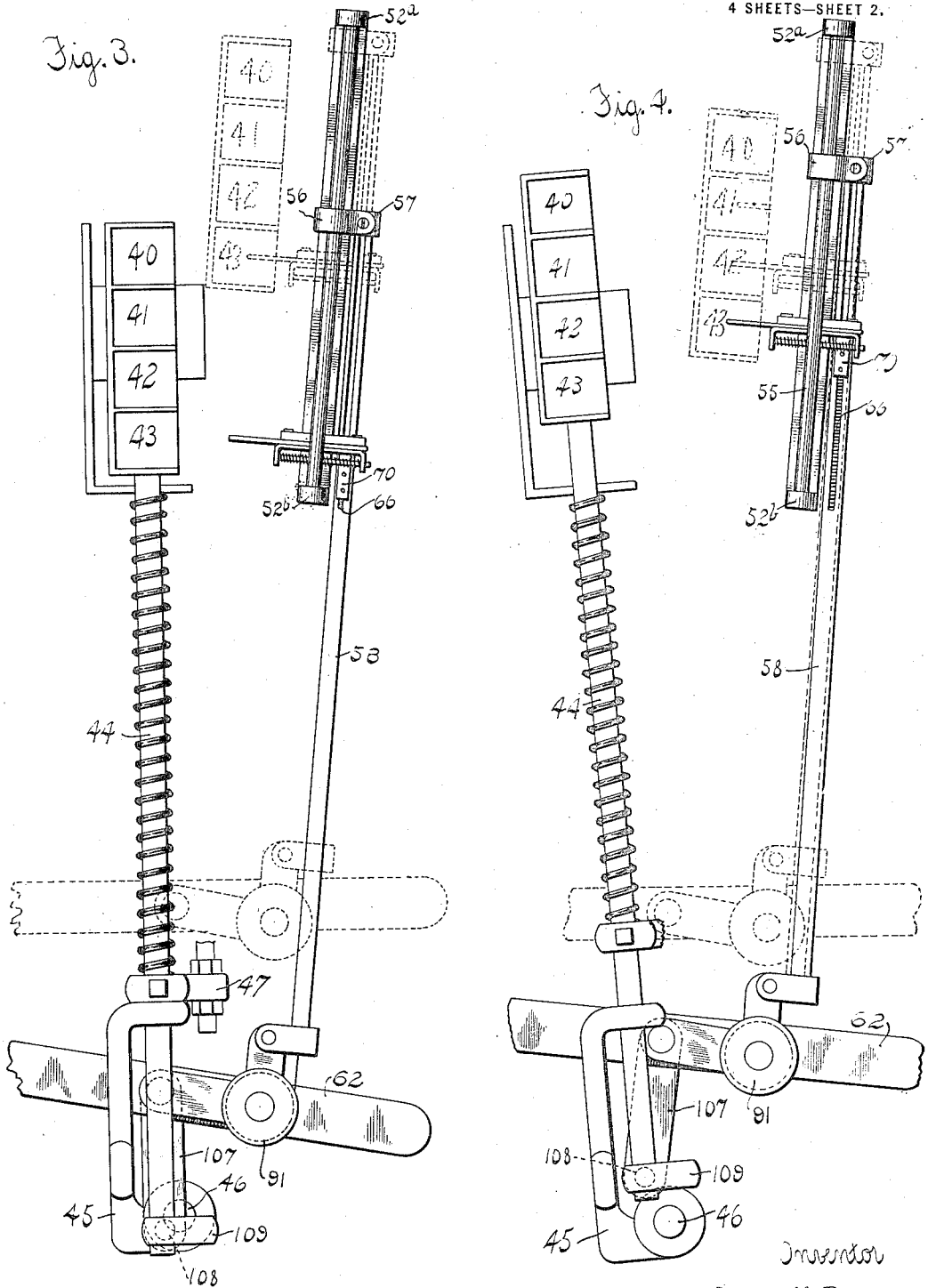

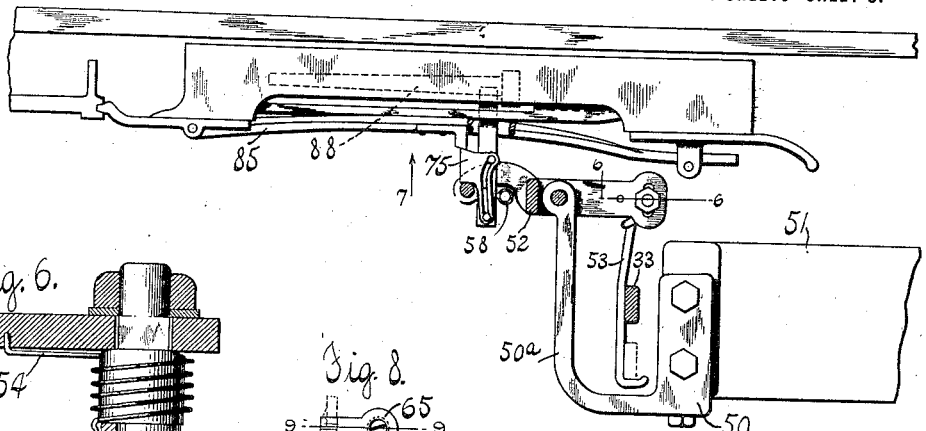
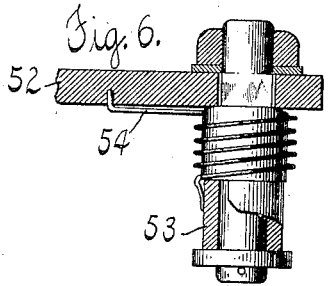
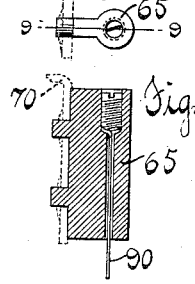
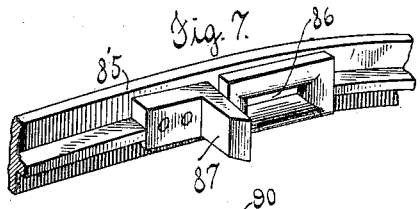
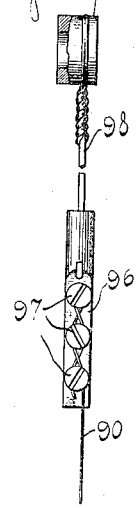
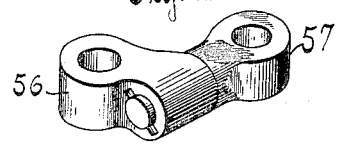
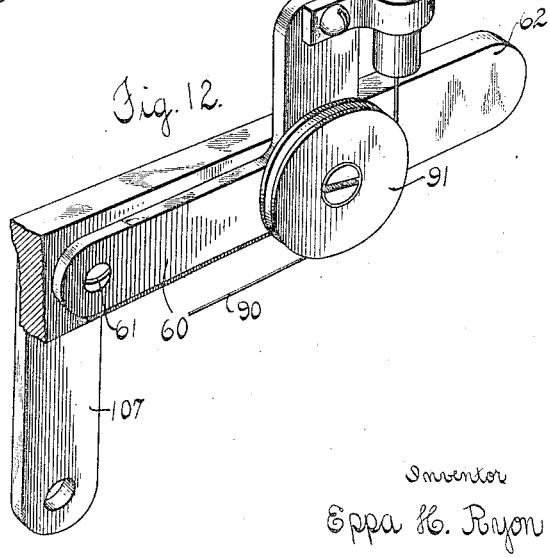
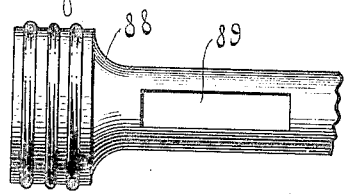

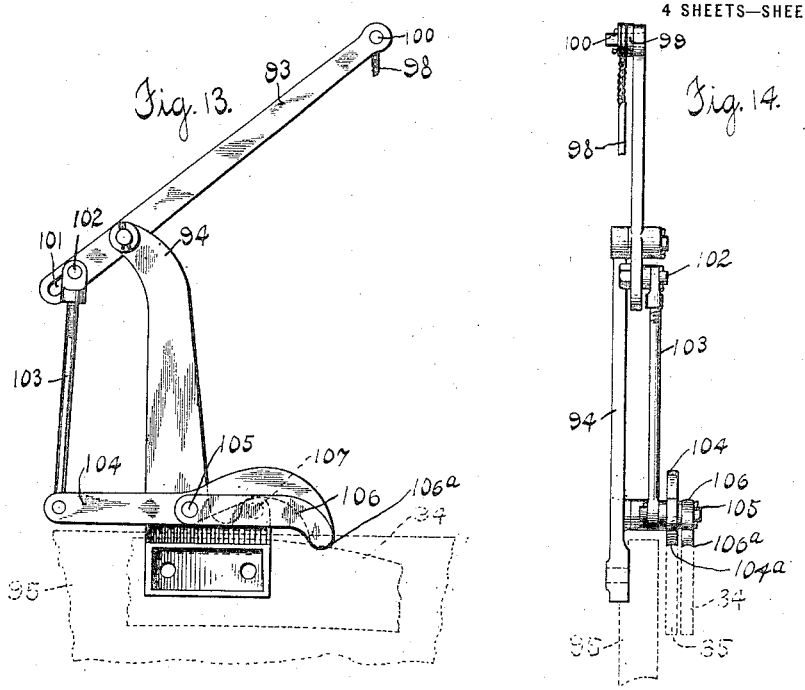
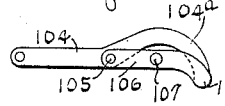
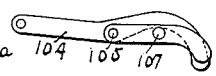
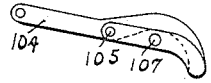
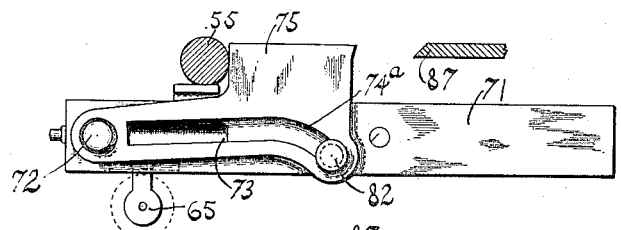
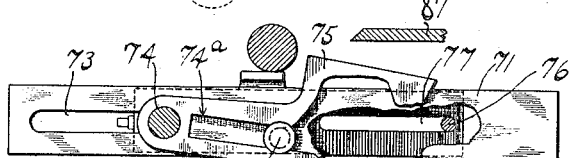
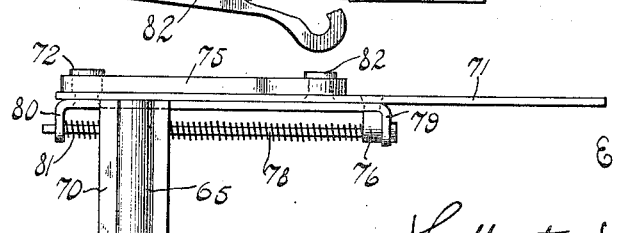

EPPA H. RYON, OF WALTHAM, MASSACHUSETTS, ASSIGNOR TO CROMPTON & KNOWLES LOOM WORKS, OF WORCESTER, MASSACHUSETTS, A CORPORATION OF MASSACHUSETTS.

WEFT-DETECTING MECHANISM.

1,205,792.            Specification of Letters Patent.      Patented Nov. 21, 1916.

Application filed February 24, 1916. Serial No. 80,271.

*To all whom it may concern:*

Be it known that I, EPPA H. RYON, a citizen of the United States, residing at Waltham, in the county of Middlesex and State of Massachusetts, have invented a new and useful Weft-Detecting Mechanism, of which the following is a specification.

This invention relates to a weft detecting mechanism and particularly to a detecting mechanism adapted for use in connection with the movable shuttle boxes of a multi-shuttle or drop box loom. In such looms the boxes must be shifted during the brief period of time elapsing between the boxing of one shuttle and the picking of the next shuttle. The time remaining after the shifting of the boxes is completed is insufficient for the determination of substantial weft exhaustion and the operation of the weft stop motion or transfer mechanism.

Accordingly it is the principal object of my invention to provide a weft detecting mechanism which will determine the substantial exhaustion of weft in an indicated shuttle before or during the movement of said shuttle to operative position, thereby providing time for the operation of the stop motion or transfer mechanism before the exhausted shuttle can be picked.

With this object in view one feature of my invention relates to the provision of a weft detector so related to the drop box pattern mechanism that it will be brought into operative relation with a shuttle as soon as the shuttle is indicated and before it has moved to operative position.

A second feature of my invention relates to the provision of operating connections so disposed that subsequent movement of the box to its operative position will not affect the relative position of the box and weft detector.

Another feature of my invention relates to the provision of separate actuating devices for the stop motion or transfer mechanism, one such actuating device being connected with each shuttle box. The detecting mechanism is brought into operative relation with each actuating device as indicated by the pattern mechanism and said actuating device is effective only when the shuttle is in the box to which the actuating device is attached.

Further features of my invention relate to certain arrangements and combinations of parts which will be hereinafter described and more particularly pointed out in the appended claims.

A preferred form of my invention is shown in the drawings in which—

Figure 1 is a side elevation of a loom frame with my improved weft detecting mechanism mounted thereon; Fig. 2 is a front elevation of the parts shown in Fig. 1; Fig. 3 is an enlarged side elevation of certain of the parts shown in Fig. 1; Fig. 4 is a view similar to Fig. 3 but showing the parts in a different position; Fig. 5 is a top plan view of the shuttle boxes and of the weft detector; Fig. 6 is a detail sectional elevation taken on the line 6—6 in Fig. 5; Fig. 7 is an enlarged detail view of a portion of one of the shuttle binders, with one of the actuating members mounted thereon, the view being taken in the direction of the arrow 7 in Fig. 5; Fig. 8 is a top plan view of the plunger upon which the weft detector is supported; Fig. 9 is a vertical sectional elevation taken on the line 9—9 in Fig. 8; Fig. 10 is an enlarged view of a wire connector; Fig. 11 is an enlarged perspective view of the swivel connection for guiding the weft detector support; Fig. 12 is a detail view of a portion of the connections through which the weft detector is positioned vertically; Fig. 13 is a front elevation of the compound lever and connections by which the detecting mechanism is controlled; Fig. 14 is a side elevation of the parts shown in Fig. 13; Figs. 15, 16, 17 and 18 show successive positions of the compound lever; Fig. 19 is a top plan view of the weft detector and actuator; Fig. 20 is a view similar to Fig. 19 but showing the parts in a different position; Fig. 21 is a side elevation of the parts shown in Fig. 19, and Fig. 22 is a detail view of a portion of a slotted bobbin adapted for use with my improved weft detector.

Referring to Figs. 1 and 2, I have shown a loom side 30, an arch 31, a lay 32, a shipper handle or lever 33, vibrator levers 34 and 35, vibrator gears 36, mutilated driving-gears 37 and 38 and pattern mechanism 39 for operating the vibrator levers 34 and 35. The lay 32 supports a plurality of drop boxes 40, 41, 42, and 43, said boxes being mounted on a rod 44, slidable in a bracket 45 mounted on the usual rock shaft 46.

The rod 44 is connected by an arm 47 and chain 48 to operating devices controlled by the pattern mechanism 39. All of the parts thus far described may be of the usual type and constitute no part of my invention.

A stand 50 (Fig. 5) is secured to the breast beam 51, said stand having a rearwardly projecting offset arm 50ᵃ which provides a bearing for a knock-off lever 52 which controls the shipper handle 33 through a link 53. The link 53 is pivotally connected with the lever 52, as shown in Fig. 6, and is yieldingly forced into engagement with the shipper handle by a spring 54. The shipper handle 33 is operative to start and stop the loom through the usual connections (not shown).

The knock-off lever 52 is provided at its left-hand end with upwardly and downwardly extending projections 52ᵃ and 52ᵇ (Fig. 2) to which are secured the opposite ends of a rod 55. A collar 56 (Fig. 11) is mounted to slide freely upon the rod 55 and provides a bearing for a swivel member 57 secured to the upper end of a slotted tube 58, the parts 56 and 57 constituting a universal sliding connection between the tube 58 and the rod 55. At its lower end, the tube 58 is secured by a clamp 59 (Fig. 12) to a bell crank 60 pivoted at 61 to a horizontal lever 62. The lever 62 near its rear end is pivoted at 63 (Fig. 1) to the loom side 30 and at its front end is guided vertically in a slotted stand 64. A plunger 65 (Figs. 8 and 9) is mounted to slide freely in the tube 58 and is forced yieldingly upward by a coil spring 66 confined within the tube 58.

A sheet metal bracket 70 (Figs. 9 and 21) is secured to the plunger 65 and constitutes a support for the weft detector or feeler 71. A stud 72 is mounted in the bracket 70 and extends upward through a slot 73 (Fig. 19) in the feeler 71 and also through a hole 74 formed in an engaging member 75, through which member the rod 55 and lever 52 are moved to stop the loom upon failure of the weft. The member 75 is further provided with a curved slot 74ᵃ for a purpose to be described. The feeler 71 is slidable relatively to the stud 72 while the member 75 is pivoted thereon.

The feeler 71 is provided with a projection 76 which extends downwardly through a slot 77 (Fig. 20) in the bracket 70 and is provided at its lower end with a recess through which extends a rod 78, fixed in lugs 79 and 80 depending from the bracket 70. A coil spring 81 encircles the rod 78 and engages the projection 76, thus yieldingly maintaining the parts normally in the position shown in Figs. 19 and 21. A stud 82 is fixed in the feeler 71 and is freely slidable in the curved slot 74ᵃ of the engaging member 75.

The drop boxes 40, 41, 42, and 43 are each provided with shuttle binders 85 of the usual type with the exception that each binder is provided with a slot 86 (Fig. 7) and with an actuating member 87. The edges of the slot are beveled outwardly to guide the feeler into the box and the actuating member 87 is designed to engage the member 75 (Fig. 19) to stop the loom upon failure of the weft. As the lay 32 moves forward, the weft detector or feeler enters the drop box through the slot 86 in the binder and engages the weft upon the bobbin 88 supported therein (Figs. 5 and 22). This bobbin is preferably provided with a slot 89 which is horizontally positioned as the bobbin is placed in the shuttle. I do not wish to be limited, however, to the use of a slotted bobbin as many features of my invention may be used to advantage with feelers of different types which do not employ this type of bobbin. So long as the slot 89 is covered with weft the feeler 71 will be forced forwardly or to the left as viewed in Figs. 19, 20 and 21 and will slide freely along the bracket 70, at the same time compressing the spring 81. As the feeler is thus moved to the left, the stud 82 carried thereby, cooperating with the slot 74ᵃ, swings the member 75 to the position shown in Fig. 20, in which it is out of the path of the actuating member 87, carried by the shuttle binder 85. The actuating member thus remains unoperative until the slot 89 in the bobbin is uncovered. When this occurs, the feeler and the member 75 remain in normal position until the member 75 is engaged by the actuating member 87, by which engagement it is moved bodily forward, carrying with it the rod 55 and swinging the knock-off lever 52 to disengage the shipper handle 33 and thus stop the loom. This result can only take place when there is a shuttle in the shuttle box. When the box is empty the feeler remains in its normal position but the actuating member 87, being mounted upon the shuttle binder, is swung into the shuttle box so far that it cannot engage the member 75. The actuating member is thus disabled when the shuttle is absent from the operatively positioned box.

Having described the detecting mechanism and the method of its operation to stop the loom, I will now describe the controlling devices by which the feeler is positioned opposite the desired shuttle box.

A flexible wire 90 (Fig. 9) is secured to the plunger 65 and extends downward through the tube 58 (Fig. 12) and around a guide roll 91 mounted on the bell crank 60. The wire 90 then passes around a second guide roll 92 (Fig. 1) mounted on the lever 62 adjacent to its pivot 63 and then extends upward to a lever 93 (Figs. 2 and 13) mounted on a bracket 94 secured to the stand 95 which supports the pattern mechanism and vibrator levers. The wire 90 may be connected to the arm 93 in any convenient manner, the connections herein shown comprising a short rod 96 (Fig. 10) having a plurality of screws 97 in the side thereof, around which the wire 90 may be twisted and securely fastened. The rod 96 may be secured by a wire link 98 to a bushing 99 adapted to fit loosely on a stud 100 secured in the end of the arm 93. It will be obvious that other suitable forms of attachment may be substituted for the form described. The lower end of the lever 93 is provided with a slot 101 (Fig. 13) within which is adjustably secured a stud 102 (Fig. 14) to which is connected the upper end of an adjustable link 103, the lower end of said link being pivotally connected to a member 104 forming one part of a compound lever. The member 104 is pivoted at 105 to the second member 106 which in turn is mounted on a fixed pivot 107 secured to the bracket 94. The members 104 and 106 are provided with portions 104ª and 106ª by which they respectively engage the vibrator levers 35 and 34. With this construction it will be evident that the vertical position of the stud 100 in the end of the arm 93 will be determined by the actual and relative positions of the two parts 104 and 106 of the compound lever, and the position of these parts will be determined by the relative position of the vibrator levers 35 and 34, which levers are under the control of the pattern mechanism 39.

The four possible relative positions of the parts of the compound lever are shown in Figs. 15, 16, 17 and 18. In Fig. 15 the parts are in the position which they will assume when the vibrator levers are both raised, the stud 100 being thereby raised to its highest position. Fig. 16 shows the position assumed when the vibrator member 35 is lowered, the member 104 being thereby swung about its pivot 105 and thus moving the stud 100 to its next lower position. In Fig. 17 is shown the position assumed when the lever 34 is lowered while the lever 35 remains in raised position. On account of the compound leverage this arrangement causes a double displacement of the lever 104 as compared with Fig. 16 and thus causes the stud 100 to move downwardly to its third position. In Fig. 18 the parts are in the position assumed when both vibrator levers are lowered and the stud 100 would be thereby moved to its lowest position.

As the stud 100 is connected through the wire 90 to the plunger 65 which supports the feeler mechanism, it follows that the feeler will assume four different vertical positions corresponding with the four relative positions of the vibrator levers. The parts are so proportioned that these four positions of the feeler correspond to the relative positions of the four shuttle boxes 43, 42, 41, and 40.

The lever 62 is connected by a link 107 (Fig. 12) to a stud 108 (Fig. 2) formed on a collar 109, secured to the lower end of the drop box supporting rod 44. The lever 62 is thus held in a definite relation to the drop boxes and as the wire 90 passes through the axis of the bearing 63 of the lever 62, it follows that the swinging of the lever 62 as the drop boxes rise and fall will produce no movement of the feeler mechanism relative to the drop boxes, the position of the feeler relative to the boxes being determined entirely by the pattern mechanism 39 acting through the vibrator levers 34 and 35, the arm 93 and the wire 90.

Having fully described the details of construction of my improved weft detecting mechanism, I will now describe briefly the principle of operation thereof.

The operation of the drop box and pattern mechanism is well known to those skilled in the art, the pattern rolls being shifted to raise and lower the vibrator levers, thereby bringing the vibrator gears into position for engagement with the mutilated teeth of the upper or lower driving gear by which the vibrator gears will be given a partial rotation which will thereby raise or lower the drop boxes through the chain 48 and other connections not shown herein.

It is customary to time the pattern mechanism to shift the vibrator levers while the lay is near its back center. A certain interval of time then elapses before the mutilated driving-gears engage the vibrator gears to shift the boxes, as the boxes cannot be moved until after the boxing of the active shuttle. By operating the compound lever 104 and 106 direct from the vibrator levers, I am able to shift the detecting mechanism to a position opposite the indicated shuttle before the drop box mechanism is brought into operation, and through the connection of the lever 62 to the drop box supporting rod 44, I am able to retain the detecting mechanism in the same position relative to the indicated shuttle while the shuttle is being moved to operative position. During this period the lay is approaching its front center and the actuating member 87 upon the corresponding shuttle binder will be effective to throw off the shipper handle if the weft in the indicated shuttle is exhausted or reduced to a determined minimum amount.

The relative movement of the drop boxes and the feeler mechanism is best shown in Figs. 3 and 4. In Fig. 3 I have shown the parts in full lines in the position which they assume when the drop box 40 is in operative position and the feeler mechanism has been moved to coöperate with the shuttle in the indicated box 43, this position corresponding to the position of the compound lever shown in Figs. 13 and 15. As the lay moves forward the drop box 43 will be raised toward the operative position shown in dotted lines in Fig. 3 and the feeler mechanism will be correspondingly raised to preserve its operative position relative to the box 43. The vertical movement of the box and feeler is commonly not completed until after the lay has passed its front center, but this continued movement of the box does not interfere with the accurate operation of the feeler. Furthermore it is not necessary to provide any dwell or stoppage in the operation of the loom to permit the feeler to operate. In Fig. 4 I have shown the box 41 in operative position in full lines and the feeler set to coöperate with the indicated box 42, the position of the compound lever being that shown in Fig. 16. In dotted lines in Fig. 4 I have shown the box 42 moved to operative position and the feeler mechanism correspondingly raised. It will thus be evident that I have invented a feeler mechanism which will be automatically moved opposite the next active shuttle as soon as the shuttle is indicated by the pattern mechanism and that the feeler mechanism will remain in operative relation with the indicated shuttle while the shuttle is being moved to its operative position, thus providing a sufficient period of time for the operation of the stop motion before the next pick of the loom. It will be understood that the bobbin 88 is so wound that a small amount of weft will remain upon the bobbin after the slot 89 is uncovered, thereby enabling the feeler to detect substantial exhaustion of weft in time to prevent the placing of a partial or incomplete pick of weft in the cloth.

While I have shown my improved weft detecting mechanism as connected to stop the loom upon substantial exhaustion of weft in the indicated shuttle, I do not wish to be limited to this combination, as it will be evident that the mechanism may be equally as well adapted to control the usual transfer mechanism of a weft replenishing loom by the provision of suitable connections of the usual type.

Having thus described my invention, it will be evident that changes and modifications can be made therein by those skilled in the art without departing from the spirit and scope of my invention as set forth in the claims and I do not wish to be otherwise limited to the details herein disclosed.

What I claim is:—

1. In a drop box loom, in combination, a plurality of shuttle boxes, means to shift said boxes vertically to operative position, a single weft detector connected to control the operation of said loom, and pattern-controlled means for moving said weft detector into position to coöperate with each box prior to the picking of the shuttle therefrom.

2. In a drop box loom, in combination, a plurality of shuttle boxes, means to shift said boxes vertically to operative position, a single weft detector connected to control the operation of said loom, and pattern-controlled means for moving said weft detector into position to coöperate with an indicated shuttle box and to determine the supply of weft therein as the lay moves forward prior to the picking of the shuttle therefrom.

3. In a drop box loom, in combination, a plurality of shuttle boxes, means to shift said boxes vertically to operative position, a single weft detector connected to control the operation of said loom, and pattern-controlled means for moving said weft detector into position to coöperate with an indicated shuttle box as the lay moves forward and before the boxes are shifted to bring the indicated box to operative position.

4. In a drop box loom, in combination, a plurality of shuttle boxes, means to shift said boxes vertically to operative position, a single weft detector connected to control the operation of said loom, vibrator levers, pattern mechanism for moving said levers to determine the position of said boxes, and connections from said vibrator levers effective to move said weft detector to a position opposite an indicated shuttle box before said box is moved to operative position.

5. In a drop box loom, in combination, a plurality of shuttle boxes, means to shift said boxes vertically to operative position, a single weft detector connected to control the operation of said loom, vibrator levers, pattern mechanism for moving said levers to determine the position of said boxes, and connections from said levers effective to move said weft detector to a position opposite an indicated shuttle box before said box is moved to operative position, said connections being so disposed that they will thereafter permit vertical movement of said shuttle boxes without causing relative movement between the indicated box and the weft detector.

6. In a drop box loom, in combination, a plurality of shuttle boxes, means to shift said boxes vertically to operative position, a single weft detector connected to control the operation of said loom, vibrator levers, pattern mechanism for moving said levers to determine the position of said boxes, and connections from said vibrator levers effective to move said weft detector to a position opposite an indicated shuttle box before said box is moved to operative position, said detector being mounted to thereafter move with said indicated box to the operative position of the box.

7. In a drop box loom, in combination, a plurality of shuttle boxes, means to shift said boxes vertically to operative position, a single weft detector connected to control the operation of said loom, vibrator levers, pattern mechanism for moving said levers to indicate said boxes, a compound lever engaging two of said vibrator levers, connections from said compound lever to said weft detector through which said lever is effective to control the vertical position of said weft detector relative to said boxes and means to move said detector with said indicated box to the operative position of said box.

8. In a drop box loom, in combination, a plurality of shuttle boxes, means to shift said boxes vertically to operative position, a single weft detector connected to control the operation of said loom, vibrator levers, pattern mechanism for moving said levers to indicate said boxes, a compound lever engaging said vibrator levers, connections from said compound lever to said weft detector, whereby said lever is effective to preliminarily position said weft detector opposite the box which is about to be moved to operative position, and means for thereafter moving said weft detector and said box in unison to the operative position of said box.

9. In a drop box loom, in combination, a plurality of shifting shuttle boxes, a rod on which said boxes are mounted, means for moving said rod to selectively position said boxes, a lever connected to move with said rod, a weft detector connected to move with said lever, and means to move said weft detector relatively to said lever.

10. In a drop box loom, in combination, a plurality of shifting shuttle boxes, a rod on which said boxes are mounted, means for moving said rod to selectively position said boxes, a lever connected to move with said rod, a weft detector connected to move with said lever, a pattern-controlled means for moving said weft detector relatively to said lever in one direction, and a spring to move said weft detector relatively to said lever in the opposite direction.

11. In a drop box loom, in combination, a plurality of shifting shuttle boxes, a rod on which said boxes are mounted, means for moving said rod to selectively position said boxes, a lever connected to move with said rod, a tube mounted to move with said lever, a weft detector slidably supported by said tube, a spring adapted to raise said weft detector, and pattern-controlled means for moving said weft detector downward against the pressure of said spring.

12. In a drop box loom, in combination, a plurality of shuttle boxes, a single weft detector, pattern-controlled means for moving the detector vertically to a position opposite an indicated box, and means for thereafter moving said box and weft detector to the level of the shuttle race.

13. A drop box loom having, in combination, a plurality of shifting shuttle boxes, a single weft detector, means to move said weft detector vertically to a position opposite any selected shuttle box, and means to render said detector operative, said means being rendered effective by the presence of a shuttle in the selected box.

14. A drop box loom having, in combination, a plurality of shifting shuttle boxes each having a movable binder, a single weft detector, means to position said weft detector opposite a selected shuttle box, and a separate actuating member mounted on each binder, each actuating member being operative only when forced outwardly by a shuttle in the box.

15. A drop box loom having, in combination, a plurality of shifting shuttle boxes each having a movable binder, a single weft detector, means to position said weft detector opposite a selected shuttle box, and a separate actuating member mounted on each binder and effective to engage and actuate said weft detector upon the exhaustion of weft in a shuttle contained in its respective box.

16. A drop box loom having, in combination, a plurality of shifting shuttle boxes each having a movable binder, a single weft detector, means to move said weft detector vertically to a position opposite a selected shuttle box, and mechanism controlled by said detector and actuated by said binder, said binder being operative only when a shuttle is positioned in the corresponding shuttle box.

17. In a drop box loom, in combination, a plurality of shuttle boxes, means to shift said boxes vertically to operative position, a single weft detector, a plurality of pattern-controlled vibrator levers, connections whereby said levers are rendered effective to move said detector to coöperate with an indicated box, and means controlled by said levers for thereafter moving said box and weft detector together to the operative position of said box.

In testimony whereof I have hereunto set my hand.

EPPA H. RYON.